(12) United States Patent
Johnson

(10) Patent No.: US 10,259,200 B2
(45) Date of Patent: Apr. 16, 2019

(54) SOLVENTLESS LAMINATING ADHESIVE FOR FLEXIBLE PACKAGING LAMINATIONS AND LAMINATED STRUCTURES MADE WITH THE ADHESIVE

(75) Inventor: Randy A. Johnson, Hilliard, OH (US)

(73) Assignee: Ashland Licensing and Intellectual Property LLC, Wilmington, DE (US)

( * ) Notice: Subject to any disclaimer, the term of this patent is extended or adjusted under 35 U.S.C. 154(b) by 0 days.

(21) Appl. No.: 13/172,304

(22) Filed: Jun. 29, 2011

(65) Prior Publication Data

US 2011/0318552 A1    Dec. 29, 2011

Related U.S. Application Data

(60) Provisional application No. 61/359,646, filed on Jun. 29, 2010.

(51) Int. Cl.
*B32B 7/12* (2006.01)
*B32B 15/08* (2006.01)
(Continued)

(52) U.S. Cl.
CPC .............. *B32B 27/08* (2013.01); *B32B 7/12* (2013.01); *B32B 15/08* (2013.01); *B32B 15/085* (2013.01); *B32B 15/09* (2013.01); *B32B 15/20* (2013.01); *B32B 27/10* (2013.01); *B32B 27/32* (2013.01); *B32B 27/34* (2013.01); *B32B 27/36* (2013.01); *B32B 27/40* (2013.01); *B32B 29/00* (2013.01); *B32B 37/1284* (2013.01); *C08G 18/12* (2013.01); *C08G 18/4808* (2013.01); *C08G 18/7837* (2013.01); *C09J 175/04* (2013.01); *B32B 38/145* (2013.01); *B32B 2037/1269* (2013.01); *B32B 2250/03* (2013.01); *B32B 2250/04* (2013.01); *B32B 2250/40* (2013.01);
(Continued)

(58) Field of Classification Search
CPC .............................................. B32B 2037/1269
USPC ........................................................ 428/195.1
See application file for complete search history.

(56) References Cited

U.S. PATENT DOCUMENTS 5,948,546 A * 9/1999 Bafford .................. B32B 27/30
156/326
5,998,538 A   12/1999 Meckel et al.
(Continued)

FOREIGN PATENT DOCUMENTS

CN       101463242       6/2009
EP       0485008 A1      5/1992
(Continued)

OTHER PUBLICATIONS

Davies, Ronald R., Ph.D., "Using Solventless Adhesives with Water-Based Inks in Flexible Packaging", Flexo Magazine, May 2008 issue.
(Continued)

*Primary Examiner* — Ian A Rummel
(74) *Attorney, Agent, or Firm* — William J. Davis; Nathalie Tietcheu

(57) ABSTRACT

Two-component solventless adhesive compositions for lamination applications and laminated structures, including flexible laminated packaging, comprising at least two substrates, including structures comprising reverse printed ink films and/or metalized films. The adhesive comprises a prepolymer having one or more oligomers with a relatively high molecular weight.

4 Claims, 3 Drawing Sheets

(51) Int. Cl.

| | |
|---|---|
| *C09J 175/08* | (2006.01) |
| *B32B 3/10* | (2006.01) |
| *B32B 37/12* | (2006.01) |
| *B32B 27/04* | (2006.01) |
| *B32B 27/06* | (2006.01) |
| *B32B 27/08* | (2006.01) |
| *B32B 27/10* | (2006.01) |
| *B32B 27/32* | (2006.01) |
| *B32B 27/34* | (2006.01) |
| *B32B 27/36* | (2006.01) |
| *B32B 29/00* | (2006.01) |
| *C08G 18/78* | (2006.01) |
| *C08G 18/12* | (2006.01) |
| *C08G 18/48* | (2006.01) |
| *C09J 175/04* | (2006.01) |
| *B32B 15/085* | (2006.01) |
| *B32B 15/09* | (2006.01) |
| *B32B 27/40* | (2006.01) |
| *B32B 15/20* | (2006.01) |
| *B32B 38/00* | (2006.01) |

(52) U.S. Cl.
CPC ... *B32B 2255/205* (2013.01); *B32B 2307/714* (2013.01); *B32B 2307/75* (2013.01); *B32B 2553/00* (2013.01); *Y10T 428/24802* (2015.01); *Y10T 428/24917* (2015.01); *Y10T 428/31504* (2015.04); *Y10T 428/31551* (2015.04); *Y10T 428/31605* (2015.04); *Y10T 428/31678* (2015.04); *Y10T 428/31681* (2015.04); *Y10T 428/31696* (2015.04); *Y10T 428/31725* (2015.04); *Y10T 428/31786* (2015.04); *Y10T 428/31855* (2015.04); *Y10T 428/31931* (2015.04)

(56) References Cited

U.S. PATENT DOCUMENTS

| | | | |
|---|---|---|---|
| 6,033,513 A * | 3/2000 | Nakamura | 156/230 |
| 6,358,668 B1 * | 3/2002 | Leenders et al. | 430/271.1 |
| 6,534,132 B1 * | 3/2003 | Lasson et al. | 427/536 |
| 6,833,044 B2 | 12/2004 | Imai et al. | |
| 2002/0174946 A1 | 11/2002 | Ikeda et al. | |
| 2005/0165163 A1 * | 7/2005 | Krebs et al. | 525/66 |
| 2006/0105187 A1 | 5/2006 | Simons et al. | |
| 2007/0129525 A1 | 6/2007 | Eichelmann et al. | |
| 2008/0099141 A1 | 5/2008 | Booth et al. | |
| 2008/0308226 A1 * | 12/2008 | Imai | C08G 18/10 156/327 |
| 2009/0044907 A1 | 2/2009 | Tribelhorn et al. | |
| 2009/0053520 A1 | 2/2009 | Lu et al. | |
| 2010/0136347 A1 | 6/2010 | Simons | |
| 2011/0014479 A1 * | 1/2011 | Song et al. | 428/423.1 |
| 2011/0189416 A1 * | 8/2011 | Kuriyama et al. | 428/35.7 |

FOREIGN PATENT DOCUMENTS

| | | |
|---|---|---|
| JP | 6080948 | 3/1994 |
| JP | 8183942 | 7/1996 |
| JP | 2000290630 | 10/2000 |
| WO | WO 2006/086715 A2 | 8/2006 |
| WO | WO 2010010664 A1 * | 1/2010 |

OTHER PUBLICATIONS

Supplemental European Search Report dated Aug. 5, 2014, EP 11 80 4181 dated May 8, 2013.

* cited by examiner ns and Laminated
SOLVENTLESS LAMINATING ADHESIVE FOR FLEXIBLE PACKAGING LAMINATIONS AND LAMINATED STRUCTURES MADE WITH THE ADHESIVE

CROSS REFERENCE TO RELATED APPLICATIONS

This application claims the benefit of U.S. Patent Application No. 61/359,646, filed Jun. 29, 2010. U.S. Patent Application No. 61/359,646 is incorporated herein in its entirety by reference.

BACKGROUND OF THE INVENTION

Field of the Invention

The invention pertains to two-component solventless adhesive compositions for lamination applications and structures, such as laminations and flexible laminated packaging, including those comprising metal or ink decals, comprising and/or made with the two-component solventless adhesive composition. The two-component solventless adhesive composition is softer than conventional two-component solventless adhesive compositions but retains the beneficial properties of conventional adhesives. The adhesive composition described herein comprises relatively high molecular weight oligomers and has an elongation.

The Related Art

Flexible packaging structures were traditionally made with solvent-borne laminating adhesives. Over the past 20-30 years, new water-borne and two-component solventless adhesives have been developed and commercialized to replace solvent-borne adhesives due to the benefit of lower costs and a desire in the industry for more environmentally friendly adhesives. However, some applications today remain using solvent-borne adhesive technology because of the specific performance of that technology and the properties of the substrates being bonded. Thus, two-component solventless laminating adhesives are not useful for all structures and applications.

Problematic structures for two-component solventless adhesives include (1) reverse printed film (i.e., polyethylene terephthalate ("PET")) to metalized film (i.e., PET) and (2) reverse printed PET film with water-base inks to secondary films. Presently these structures are typically made with either solvent-borne or water-borne laminating adhesives. Metalized film is generally a plastic film sheet having attached to the film a layer of metal, generally a thin metal layer. Metalized films are used in flexible laminated packaging materials where it is desired to reflect light from the contents of the packaging or for visual appearance of consumer packaging.

Typical structures of reverse printed PET laminated to the metal side of metalized PET with typical two-component solventless laminating adhesive results in low bonds with up to 100% metal failure from the metalized PET. Such failure result typically does not happen when using solvent-borne or water-borne laminating adhesives. When two-component solventless adhesive is applied with reverse printed PET with water-base inks, the water-base ink decals off of the PET at lower bond values.

Conventional two-component solventless adhesives comprise relatively lower molecular weight monomers and relatively lower molecular weight oligomers that typically act as reactive diluents. These low molecular weight reactive materials generally provide favorable characteristics and properties for many, but not all, laminating applications.

Without wishing to be bound by any theory, the inventor believes that in specific applications, such as those discussed above involving reverse printed film to metalized film and reverse printed film, including reverse printed PET film, with water-base inks to secondary films, the relatively lower molecular weight monomers and relatively lower molecular weight oligomers contribute to the negative affects of decaling metal (demetallization) or ink from the film.

All parts and percentages set forth herein are on a weight-by-weight basis unless specified otherwise. The molecular weight referred to herein is the number average molecular weight (Mn) in grams/mole ("g/mole").

SUMMARY OF THE INVENTION

The two-component solventless adhesive described herein improves bond strength in many applications, including in structures comprising either the metal or ink decals. The two-component solventless adhesive is softer than conventional two-component solventless adhesives but maintains many of the same benefits as conventional two-component solventless adhesives such as low enough viscosity to apply at 100% solids, good adhesion, chemical resistance, and the like.

The two-component solventless adhesive comprises high molecular weight oligomers, i.e. oligomers having higher molecular weight than oligomers used in conventional two-component solventless adhesives. The two-component solventless adhesive is suited for any lamination application but is particularly suited for applications where conventional solventless adhesives provide poorer performance, such as for (1) reverse printed film (i.e., PET) to metalized film (i.e., PET) and (2) reverse printed film, including reverse printed PET film, with water-base inks to secondary films.

DETAILED DESCRIPTION OF THE INVENTION

Figure 1:
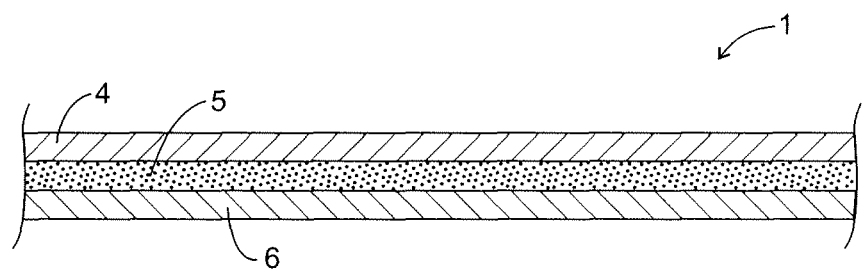
FIG. 1 illustrates a side, cross-sectional view of a laminated flexible packaging material in accordance with the invention.

Two-component solventless adhesives are supplied as two separate components and mixed prior to application followed by curing. The two components are called the prepolymer and the curative. The two-component solventless adhesive has no solvent and/or is applied without solvent, such as organic solvent or water.

The two-component solventless adhesive comprises oligomers having relatively high molecular weight, such as oligomers having molecular weight in excess of about 1,000 g/mole, typically oligomers having molecular weight of at least about 3,000 g/mole such as about 3,500 g/mole or more, for example oligomers having a molecular weight of about at least 8,000 g/mole and also those having molecular weight in excess of about 10,000 g/mole. Included are oligomers having molecular weight in the range of about 3,500 g/mole to about 20,000 g/mole.

The two-component solventless adhesive composition may comprise a combination of relatively high molecular weight oligomers, having different molecular weights. Thus, the two-component solventless adhesive may have a first oligomer and, in embodiments where a combination of oligomers are present, a second oligomer. For example, the combination of oligomers having a molecular weight of about 2,000 g/mole to about 5,000 g/mole, preferably about 3,000 g/mole to about 5,000 g/mole including about 3,500 g/mole to about 5,000 g/mole, and another having a molecular weight of about 5,000 g/mole to about 10,000 g/mole or more, such as about 5,500 g/mole to about 10,000 g/mole.

The two-component solventless adhesive typically has 100% solids content, although in embodiments the adhesive may have less than 100% solids content. The molecular weight of the oligomer must be such that, when combined with other ingredients of the adhesive, the viscosity is not too high for application without any or a significant amount of solvent.

Oligomers useful in the invention include all types of polyols, for example polypropylene oxide having relatively high molecular weight. Polyether polyols such as polyoxypropylene glycol, polyoxyethylene glycol and copolymers of ethylene and propylene oxide may also be used. Also, polyesterpolyols such as those compositions obtained from diacids or higher such as, adipic acid, and various alkane diols are useful. Examples of alkane diols include 1,3-propanediol, 1,4-butanediol, 1,5-pentanediol and 1,6-hexanediol. Other useful polyols are obtained by copolymerizing at least one compound of ethylene oxide, propylene oxide, butylene oxide, tetrahydrofuran, and the like with at least one compound having at least two active hydrogen atoms on average in one molecule such as polyhydric alcohols which include ethylene glycol, propylene glycol, dipropylene glycol, glycerol and the like. Other suitable polyhydric compounds include sucrose, ethylenediamine, propylenediamine, triethanolamine, 1,2-propanedithiol, and the like.

Typically, the oligomers are incorporated into the prepolymer; however, the oligomers can be incorporated into the curative or in both the curative and prepolymer. Preferably, the oligomers have relatively low viscosity.

The oligomers are incorporated in relatively high amounts and can be incorporated as all or part of the total amount of oligomer in a two-component solventless adhesive formulation. For example, when the relatively higher molecular weight oligomers are incorporated into the prepolymer, the amount of such oligomers may be at least about 20% by weight of the prepolymer, such as at least about 40% by weight of the prepolymer and may be as high as at least about 60% by weight of the prepolymer, including in the ranges of about 20% by weight to about 80% by weight, such as about 20% by weight to about 60% by weight, such as about 20% by weight to about 40% by weight, all by weight of the prepolymer.

The prepolymer may comprise other components typically found in the prepolymer part of two-component solventless adhesives, such as isocyanates. Isocyanates useful in the prepolymer of the invention include hexamethylene diisocyanate, toluene diisocyanate (TDI), diphenylmethane diisocyanate (MDI) (which is available commercially as MONDUR® MR from Bayer Material Science, Pittsburgh, Pa., USA), allophonate-modified diphenylmethane diisocyanate (allophonate modified MDI which is commercially available as MONDUR MA from Bayer Material Science), m- and p-phenylene diisocyanates, bitolylene diisocyanate, cyclohexane diisocyanate (CHDI), bis-(isocyanatomethyl) cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, MONDUR MR or MONDUR MRS (both available from Bayer Material Science), isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and combinations thereof. The preferred isocyanate comprises MDI, such as MONDUR MA from Bayer Material Science, which is an allophonate modified MDI. Typically, when the prepolymer part includes both polyol and isocyanate, the isocyanate content of the prepolymer is about 5% to about 25%, preferably about 6% to about 17%.

The prepolymer part of the two-part solventless adhesive composition typically comprises the relatively high molecular weight oligomers and isocyanate. For example, in an embodiment the prepolymer comprises isocyanate and oligomers having molecular weight in excess of about 1,000 g/mole, typically oligomers having molecular weight of at least about 3,000 g/mole such as about 3,500 g/mole or more, for example oligomers having a molecular weight of about at least 8,000 g/mole and also those having a molecular weight in excess of about 10,000 g/mole. Included are oligomers having a molecular weight in the range of about 3,500 g/mole to about 20,000 g/mole. In a further embodiment, the prepolymer comprises a combination of relatively high molecular weight oligomers, having different molecular weights, for example a composition having a molecular weight of about 2,000 g/mole to about 5,000 g/mole, preferably from about 3,000 g/mole to about 5,000 g/mole including about 3,500 g/mole to about 5,000 g/mole and another having a molecular weight of about 5,000 g/mole to about 10,000 g/mole or more, such as about 5,500 g/mole to about 10,000 g/mole. The prepolymer may consist essentially of or consist of these components and combinations.

In addition, the relatively high molecular weight oligomers can be used in epoxy/amine solventless two-component adhesives.

The curative part of the two-component solventless adhesive may be any curative typically used in two-part adhesives and is typically an isocyanate reactive curative. The curative part comprises an isocyanate reactive component, such as a component selected from the group consisting of polyhydroxyls, polythiols, polyamines, and the like, and combinations thereof. The curative part may also comprise isocyanates and/or oligomers, including those mentioned above with respect to the prepolymer. PURELAM® laminating adhesives available from Ashland Inc., Dublin, Ohio, USA, like PURELAM 6050, may comprise the isocyanate reactive curative.

In addition to the above, other components may be included in the two-component solventless adhesive, in the prepolymer, the curative or both the prepolymer and curative. These components include polymerization control agents, inhibitors, antioxidants, wetting agents, adhesion promoters, fillers and the like. Polymerization control agents include dibutyl tindilaurate and trimethyl amine. Fillers include finely divided silicon dioxide, bentonites or calcium carbonate.

The prepolymer is generally made by reacting an excess amount of isocyanate with an isocyanate reactive material, such as a polyether polyol, which results in the oligomers described herein and excess isocyanate. Other components of the prepolymer may be added prior to or after the reaction. The curative may be made by reacting a diacid (or higher order acid) with a glycol or a commercially available isocyanate reactive product may be used for the curative in the two-component solventless adhesive.

The two-component solventless adhesive is applied with any type of substrates to create a laminated structure, and laminated structures made with or comprising the two-component solventless adhesive are within the scope of the invention, such as flexible laminated packaging materials. The adhesive is compatible with any substrates.

Metalized films are useful with the two-component solventless adhesive. The metalized films comprise a plastic sheet and a layer of metal generally deposited on the plastic sheet. The metalized film is usually formed prior to the process for making the laminated structures described herein. The plastic material of the metalized film may be selected from the group consisting of PET, biaxially oriented polypropylene ("BOPP"), polylactic acid and polyethylene. The metal layer may be aluminum. Commercially available metalized films that may be used in the invention include 48 gauge metalized polyester film (BARRIER-MET® Polyester) from VACUMET®, Austell, Ga., U.S.A. and metalized oriented polypropylene ("OPP") films (METTALYTE™ OPP) from ExxonMobil Chemicals, Houston, Tex., U.S.A., such as 70 gauge metallic OPP from ExxonMobil.

The two-component solventless adhesive inhibits, and in cases prevents, decaling (or demetallizing) of the metal layer from the plastic sheet of the metalized film in laminated structures wherein the metalized film is laminated to one or more other substrates with the two-component solventless adhesive. Also, the two-component solventless adhesive inhibits, and in cases prevents, decaling of water-base ink from substrates in laminated structures wherein at least one substrate comprising water-base ink is laminated to one or more other substrates, including metalized substrates, with the two-component solventless adhesive. Decaling or demetallizing can occur when the laminated structure is torn, in that the metal layer will be removed from the plastic sheet and remain attached to the other substrate in the laminated structure or the water-base ink will remove from the printed substrate. This is undesirable, particularly with respect to flexible laminated packaging materials for consumer products.

The laminated flexible packaging materials may be formed by conventional means understood to those skilled in the art. The laminated flexible packaging materials described herein can be produced using conventional techniques and replacing conventional laminating adhesives with the two-part solventless adhesive described herein. Generally, the process for making the laminated structures comprises the steps of providing at least two substrates, each having an upper surface and a lower surface, providing the two-component solventless adhesive described herein, applying the adhesive to a surface of at least one of the substrates and bonding the substrates together. Preferably, at least one of the two substrates is either printed with a water-base ink or comprises a metalized film substrate, and processes wherein one of the substrates comprises a water-base ink and the other comprises a metalized film substrate are within the scope of the invention. Typical methods of applying adhesive include use of web coating methods such as roll coating, gravure, offset gravure, and the like. The adhesive may be applied and cured in-line with the printing or off-line in a separate laminating step as desired.

When the prepolymer and curative are mixed, the adhesive begins to cure and continues to cure over a period of time until the adhesive cures. During curing, the oligomers in the prepolymer and the isocyanate reactive component of the curative react. The laminated structures described herein comprise a cured adhesive layer, which adhesive in the uncured state is the two-component solventless adhesive described herein.

Figure 2:
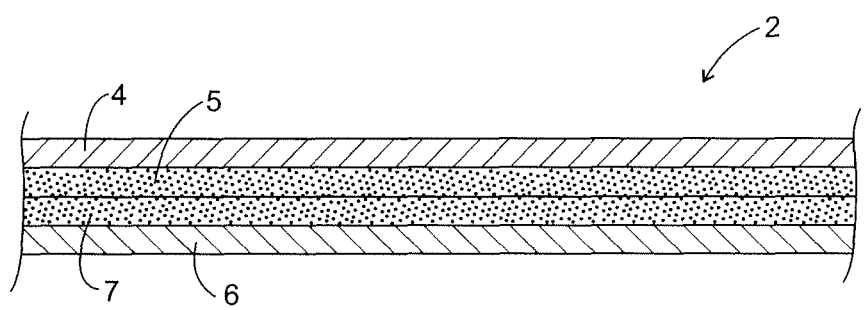
FIG. 2 illustrates a side, cross-sectional view of a laminated flexible packaging material in accordance with the invention.
Figure 3:
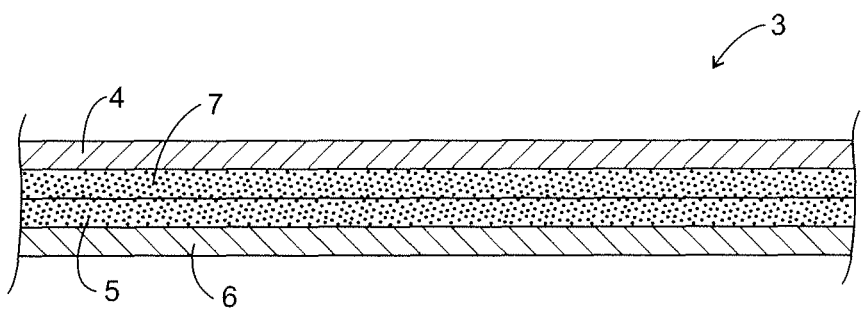
FIG. 3 illustrates a side, cross-sectional view of a laminated flexible packaging material in accordance with the invention.

The laminated structures, such as the flexible laminated packaging, comprise at least two substrates, such as layers of flexible material, bonded together having at least one layer of the adhesive, a cured adhesive layer which is a cured form of the solventless two-part adhesive, between each substrate thereby forming a laminated construction. Laminated structures, such as flexible laminated packaging materials, are illustrated in FIGS. 1-3. As shown in FIGS. 1-3, the structures, i.e. laminated flexible packaging material, 1, 2 and 3 comprise at least one second substrate, such as a second layer of flexible material, 4 laminated to a first substrate, such as a first layer of flexible material, 6 by the solventless two-part laminating adhesive described herein 5, where layer 6 is the layer that will be on the inside of the finished construction, i.e. package. The adhesive layer 5 may be a cured adhesive layer of the two-component solventless adhesive described herein. FIGS. 1-3 illustrate the laminated structures 1, 2 and 3 with two substrates, however, laminated flexible packaging materials, as well as other laminated structures made with the solventless two-component laminating adhesive described herein, comprising more than two substrates, are within the scope of the invention, such as 3, 4, 5, 6, 7 and 8, or more, substrates.

Examples of suitable materials for the at least one second substrate 4 and first substrate 6 independently include, but are not limited to: paper, aluminum foil, metalized films, coated films, printed films, co-extruded films, polyester films, polyolefin based films, white polyolefin based films, polyamide based films, copolymer films, and films containing various polymer blends. Typically, the two-part solventless laminating adhesive is used in flexible laminating packaging wherein one of the substrates is a reverse printed film, such as a reverse printed film comprising water-base inks, and the other substrate is a metalized film. In embodiments, the laminated construction, for example flexible laminated packaging comprises reverse printed film (such as PET) laminated with metalized film (such as metalized PET film) or the combination of reverse printed PET film, such as those printed with water-base inks, laminated to one or more secondary films of any of the types described herein. Also, one or more of the films may comprise linear low density polyethylene.

FIG. 2 shows an example of a laminated flexible packaging material 2 comprising reverse printed film. The structure shown in FIG. 2 comprises a substrate 6, such as a clear layer, which has been reverse printed 7 on the inside surface thereof, for example a reverse printed PET film, and then bonded to a second substrate 4, for example a metalized film layer or other secondary film, using the solventless two-part adhesive composition 5. In this type package, the printed material would be readable on the inside surface of the package.

FIG. 3 shows a further example of a laminated flexible packaging material 3 comprising reverse printed film. The structure shown in FIG. 3 comprises a substrate 4, such as a clear layer, which has been reverse printed 7 on inside surface thereof, for example a reverse printed PET film, and then bonded to a substrate 6, for example a metalized film layer or other film like linear low density polyethylene using the solventless two-part adhesive composition 5. In this type of package, the printed material would be readable on the outside of the package.

In an embodiment, such as when using low surface energy substrates, such as polyolefins, the surface of the substrate to be bonded may be surface-treated to enhance adhesion. Surface treating is well known and any conventional surface treating method can be used as desired for the particular application. Examples of suitable surface treating methods include corona treatments, chemical treatments, plasma treatments and flame treatments.

The two-component solventless adhesive comprising the relatively high molecular weight oligomers reduces or eliminates metal decal or ink decal when using the two-component solventless laminating adhesives on substrates or inks that traditionally exhibit decal when conventional two-component solventless adhesives are applied. Examples include laminations of reverse printed PET film/solventless adhesive/metalized PET film and reverse water-base ink printed PET/solventless adhesives/sealant film (i.e., linear low density polyethylene). For example, replacing conventional polyols of relative low molecular weights in a two-part solventless adhesive formulation with polyols having a molecular weight of about 8,000 g/mole provided significant improvement causing the failure mode to go from low bonds with 100% metal decal to bonds greater than 400 gli with adhesive failure on reverse printed PET adhesively bonded to metalized PET.

EXAMPLES

Comparative Example A

Figure 4:
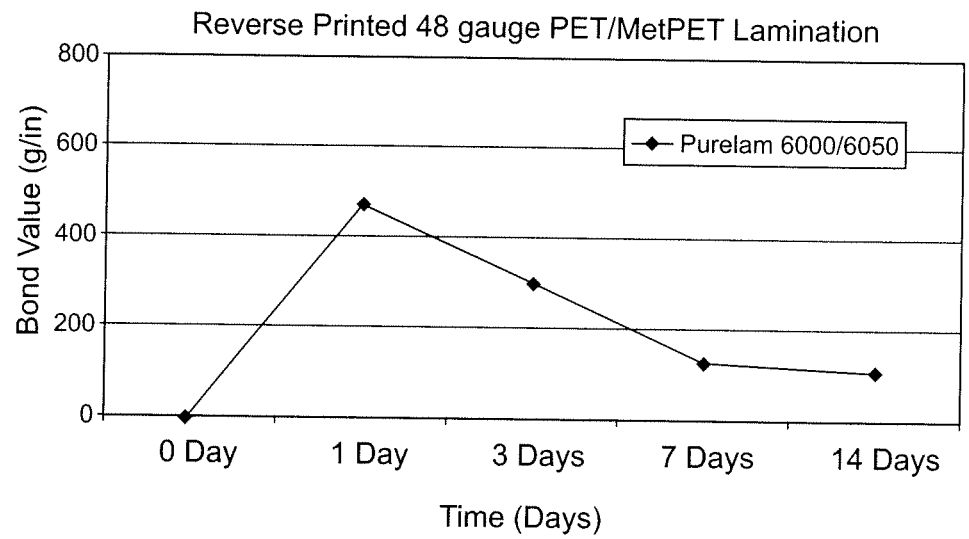
FIG. 4 is a graph showing bond value in relation to curing time in days for a reverse printed 48 gauge PET and metallic PET film laminated structure.

A reverse printed PET film was bonded with a standard solventless laminating adhesive (PURELAM® 6000 (prepolymer)/6050 (curative), available from Ashland Inc.) to the metal side of metalized PET film. The bond strength of the laminated structures was tested using ASTM standard D1876-08 which is incorporated herein by reference in its entirety and the results are shown graphically in FIG. 4. Initial bond development is normal, but as the adhesive fully cures the failure mechanism changes from cohesive adhesive failure to demetalization with low bond strengths.

Comparative Example B

Figure 5:
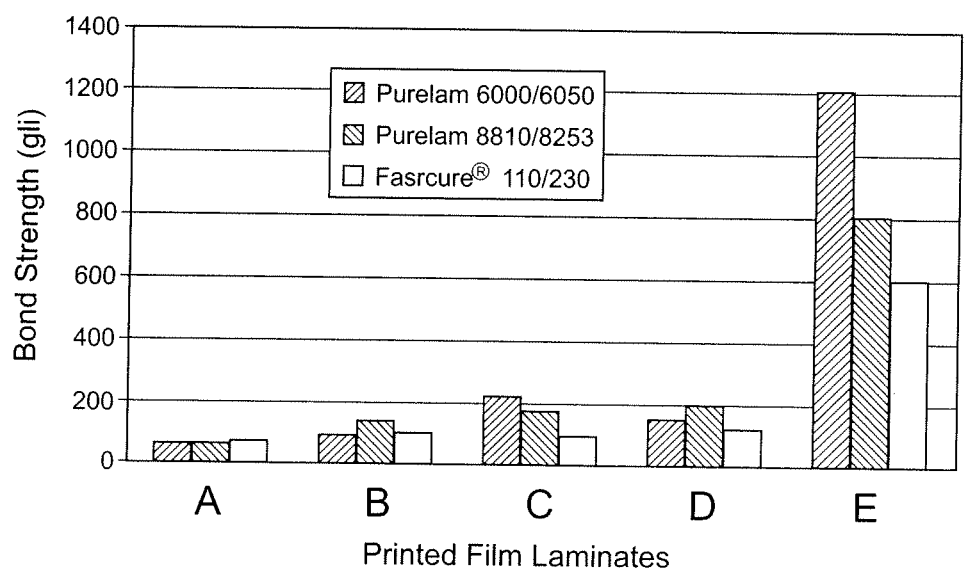
FIG. 5 is graph showing bond strength for various laminated structures comprising water-base ink printed films made with various conventional adhesives.

Reverse printed PET with standard water-base acrylic inks were bonded to second substrates with three conventional laminating adhesives as noted in FIG. 5. The adhesive applied to make the laminations for this comparative example are PURELAM 6000 (prepolymer)/6050 (curative), PURELAM 8810 (prepolymer)/8253 (curative) and FASTCURE™ 110 (prepolymer)/230 (curative); all available from Ashland Inc. The substrates for each of the printed film laminates of FIG. 5 are the following:

A—PET reverse printed with water-base acrylic ink laminated to PET

B—PET reverse printed with water-base acrylic ink laminated to polyethylene

C—biaxially oriented polypropylene ("BOPP") with water-base acrylic ink laminated to BOPP D—BOPP with water-base acrylic ink laminated to polyethylene E—BOPP with hybrid ink laminated to BOPP.

The bond strength (gil) was tested for each lamination using ASTM standard D1876-08. The results are set forth in the graph in FIG. 5. The bond strength was measured at 14 days of curing time.

Example 1

A prepolymer (Experimental Prepolymer 1) was made in accordance with the invention by combining the ingredients set forth in Table 1. A prepolymer was made for comparative purposes as a control (Control Prepolymer A) by combining the ingredients set forth in Table 2 including polypropylene oxide having a molecular weight of 1,000 g/mole.

TABLE 1

Experimental Prepolymer 1

| Materials | Wt % |
|---|---|
| Polypropylene oxide molecular weight 8,000 g/mole | 40 |
| Polypropylene oxide molecular weight 3,000 g/mole | 21 |
| MONDUR MDI | 39 |

TABLE 2

Control Prepolymer A

| Materials | Wt % |
|---|---|
| Polypropylene oxide molecular weight 1,000 g/mole | 40 |
| MONDUR MDI | 60 |

Both the Experimental Prepolymer 1 and Control Prepolymer A were mixed with a PURELAM 6050 isocyanate reactive curative from Ashland Inc. PURELAM 6050 has a hydroxyl number of 270 and viscosity 2,000 cps. The mix ratios for both adhesive formulations were calculated in order to provide about 20% excess isocyanate (Isocyanate Index=1.2) for each adhesive. The experimental has good phase stability and comparable viscosity to the control.

The adhesive formulation comprising Experimental Prepolymer 1 and the adhesive formulation comprising Control Prepolymer A were each applied in making a reverse printed PET film to metalized PET film layer structure. Both structures were tested for adhesion in accordance with standard testing protocols and the results are set forth in Table 3.

TABLE 3

Adhesion Results
Reverse Printed PET film/solventless adhesive/metallized PET film layer

|  | 1 Day |  | 3 Days |  | 7 Days |  | 14 Days |  |
|---|---|---|---|---|---|---|---|---|
| Control Prepolymer/ PURELAM 6050 | 1.035 | c | 0.675 | 50% MT | 0.279 | 100% MT | 0.245 | 100% MT |
|  | 1.010 | c | 0.681 | 50% MT | 0.212 | 100% MT | 0.216 | 100% MT |
|  | 1.096 | c | 0.607 | 50% MT | 0.342 | 100% MT | 0.251 | 100% MT |
| Avg. (lbs/in) | 1.047 |  | 0.654 |  | 0.278 |  | 0.237 |  |
| Avg. (g/in) | 475 |  | 297 |  | 126 |  | 108 |  |
| EXP #1/PURELAM 6050 | 0.000 |  | 0.186 | c | 0.929 | c | 1.351 | fs |
|  | 0.000 |  | 0.221 | c | 1.023 | c | 1.116 | a |
|  | 0.000 |  | 0.205 | c | 0.887 | c | 1.187 | a |
| Avg. (lbs/in) | 0.000 |  | 0.204 |  | 0.946 |  | 1.218 |  |
| Avg. (g/in) | 0 |  | 93 |  | 429 |  | 552 |  | c—cohesive failure
a—adhesive failure
MT—metal transfer
fs—film split/failure

The data set forth in Table 3 demonstrates that the structure made with the adhesive comprising Experimental Prepolymer 1 provided better adhesion to the structure compared to the adhesive formulation comprising Control Prepolymer A.

Examples 2-6

Prepolymers were prepared for Examples 2-6 from the components set forth in Table 4. Examples 2 and 3 are control prepolymers not made with high molecular weight oligomers and Examples 4, 5 and 6 are made with oligomers having molecular weight of at least 3,000 g/mole. The prepolymers for Examples 2-6 were prepared by reacting the isocyanate (MONDUR MA 2300 from Bayer Material Science) with the oligomers.

TABLE 4

|  | Example 2 | | Example 3 | | Example 4 | | Example 5 | | Example 6 | |
|---|---|---|---|---|---|---|---|---|---|---|
|  | mass | Adh wt % | mass | Adh wt % | mass | Adh wt % | mass | Adh wt % | mass | Adh wt % |
| Prepolymer |  |  |  |  |  |  |  |  |  |  |
| MONDUR MA 2300 | 78.0 | 46.8 | 70.0 | 44.1 | 60.0 | 40.0 | 47.7 | 34.4 | 44.7 | 32.2 |
| Polypropylene glycol molecular weight 1,000 | 11.0 | 6.6 | 0.0 | 0.0 | 0.0 | 0.0 | 0.0 | 0.0 | 0.0 | 0.0 |
| Polypropylene glycol molecular weight 2,000 | 11.0 | 6.6 | 30.0 | 18.9 | 0.0 | 0.0 | 16.2 | 11.7 | 0.0 | 0.0 |
| Polypropylene glycol molecular weight 3,000 | 0.0 | 0.0 | 0.0 | 0.0 | 40.0 | 26.7 | 17.0 | 12.3 | 17.0 | 12.3 |
| Polypropylene glycol molecular weight 8,000 | 0.0 | 0.0 | 0.0 | 0.0 | 0.0 | 0.0 | 19.2 | 13.9 | 38.4 | 27.7 |
| Total | 100.0 | 60.0 | 100.0 | 63.0 | 100.0 | 66.7 | 100.0 | 72.2 | 100.0 | 72.2 |
| Curative |  |  |  |  |  |  |  |  |  |  |
| PURELAM 6050 polyester | 100 | 40.0 | 100 | 37.0 | 100 | 33.3 | 100 | 27.8 | 100 | 27.8 |
| Adhesive Total |  | 100 |  | 100 |  | 100 |  | 100 |  | 100 |
| % NCO Prepolymer | 16.6 |  | 14.8 |  | 12.7 |  | 9.6 |  | 9.4 |  |
| OH# Curative | 270 |  | 270 |  | 270 |  | 270 |  | 270 |  |
| Mix Ratio |  | 1.7:1 |  | 1.7:1 |  | 2:1 |  | 2.6:1 |  | 2.6:1 |
| Isocyanate Index |  | 1.23 |  | 1.25 |  | 1.26 |  | 1.24 |  | 1.21 |

The prepolymers of Examples 2-6 were used with curative as a laminating adhesive. The prepolymers were mixed with PURELAM 6050 isocyanate reactive curative from Ashland Inc. Additionally, commercially available laminating adhesives from Ashland (PURELAM 6000 (prepolymer)/6050 (curative)) and PURELAM 8810 (prepolymer)/8253 (prepolymer)) were run as controls. PURELAM 6050 has a hydroxyl number of 270 and viscosity 2,000 cps. The mix ratios for all adhesive formulations were calculated in order to cps. The mix ratios for all adhesive formulations were calculated in order to provide about 25% excess isocyanate (Isocyanate Index=1.25) for each adhesive. All of the mixed adhesives had good phase stability.

Figure 6:
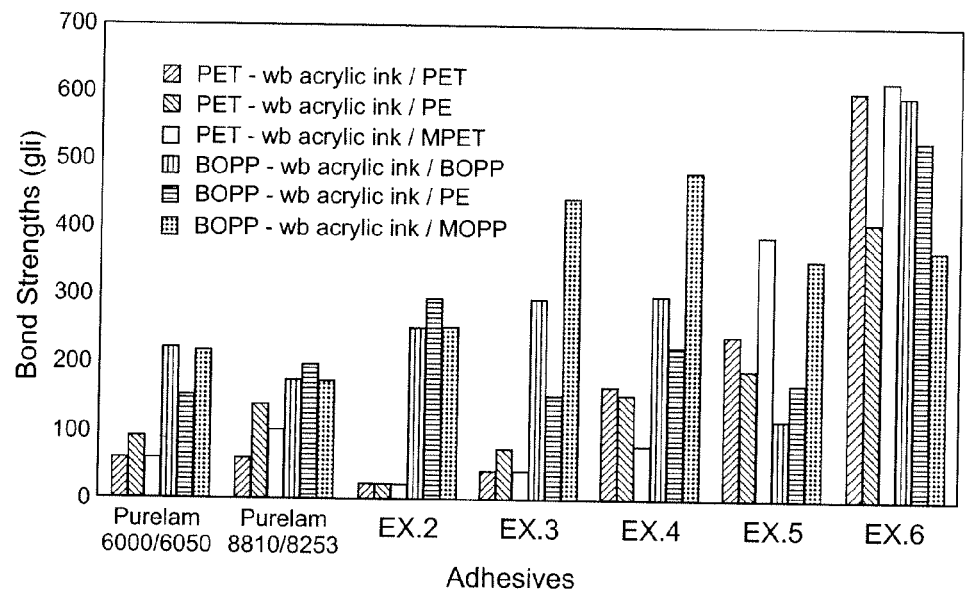
FIG. 6 is a graph showing bond strength for various laminated structures comprising water-base ink printed films made with control adhesive formulations and adhesive formulations in accordance with the invention.
Figure 7:
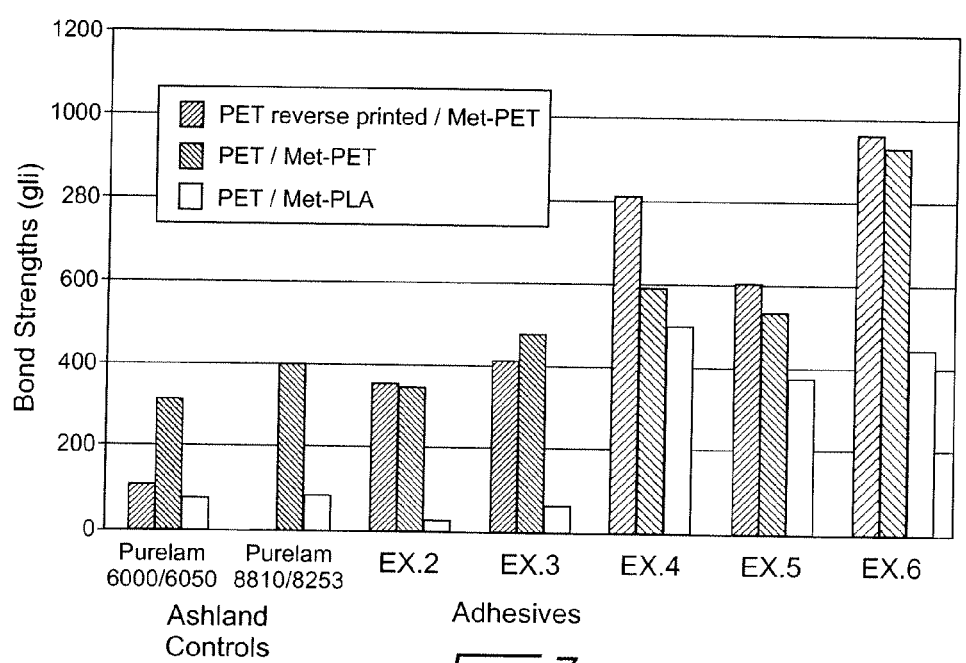
FIG. 7 is a graph showing bond strength for various laminated structures comprising metalized films made with control adhesive formulations and adhesive formulations in accordance with the invention.

The adhesives of Examples 2-6 and the two Ashland adhesive controls were used to make laminated structures with water-base acrylic ink printed substrates and metallic substrates and tested for bond strength using ASTM standard D1876-08. The results are set forth in FIGS. 6 and 7. The combination of substrates used in the laminated structures are as follows:

FIG. 6

PET printed with water-base acrylic ink and PET
PET printed with water-base acrylic ink and polyethylene
PET printed with water-base acrylic ink and metallic PET film
    BOPP with water-base acrylic ink and BOPP
BOPP with water-base acrylic ink and polyethylene
BOPP water-base acrylic ink and metallic BOPP film

FIG. 7

Reverse Printed PET and metallic PET film
    PET and metallic PET film
    PET and metallic polylactic acid The water-base ink used for the printed substrates in Examples 2-6 and the Ashland controls was water-base acrylic, formula is MWF-4135 blended with 10% MWF-120 Extender, from Wikoff Color Corp., Fort Mill, S.C., U.S.A. The water-base ink was printed with 550 LPI 4.3 BCM ceramic anilox. Print receptive films were corona treated with 1.9 kiloWatts. Line speed for printing was 210 feet per minute on a Nilpeter FA-4, 16 inch web width.

A pilot lab scale solventless adhesive press was used for making the film-to-film laminations with the adhesives of Examples 2-6 and the Ashland controls with the substrates discussed above and shown in the graphs of FIGS. 6 and 7. Primary unwind film with 12" width is corona treated followed by roll coat with 1-2 lb/ream of the adhesives of Examples 2-6 and the Ashland controls followed by nipping to secondary corona treated film that is 12" wide. Line speed is 40 feet per minute. For laminations including water-base printed film, this film is the primary web with the solventless adhesive coated directly on top of the ink followed by nipping to secondary web. For laminations including metalized films, this substrate is the secondary web. The metal side is facing the solventless adhesive. The laminated film structures are cured at ambient temperature and the bond strengths were measured at 14 days after lamination.

What is claimed is:
1. a laminate structure comprising
 a) a first substrate of polyethylene terephthalate and having a first substrate surface with a water-base ink directly on the first substrate surface and a second substrate of metallized polyethylene terephthalate; and
 b) a cured adhesive layer in contact with the water-base ink bonding the first substrate to the second substrate comprising a solventless two-component adhesive composition which prior to curing has a prepolymer comprising a first polyoxypropylene glycol having molecular weight of about 2,000 g/mole to about 5,000 g/mole and a second polyoxypropylene glycol having a molecular weight of about 5,500 g/mole to about 10,000 g/mole.

2. A process for making a laminated structure comprising the steps of
 a) providing a first substrate and a second substrate each having an upper surface and a lower surface wherein the first substrate is polyethylene terephthalate and has a water-base ink directly on the upper surface or lower surface and the second substrate is metallized polyethylene terephthalate;
 b) providing a solventless two-component adhesive composition which prior to curing has a prepolymer comprising a first polyoxypropylene glycol having a molecular weight of about 2,000 g/mole to about 5,000 g/mole and a second polyoxypropylene glycol having a molecular weight of about 5,500 g/mole to about 10,000 g/mole;
 c) bonding the first substrate to the second substrate to form a laminated structure.

3. The process of claim 2 wherein the adhesive is applied by a method selected from the group consisting of roll coating, gravure and offset gravure.

4. The process of claim 2 wherein at least one of the first substrate or second substrate is surface treated.

\* \* \* \* \*